United States Patent [19]

Easterly et al.

[11] Patent Number: 4,912,558

[45] Date of Patent: Mar. 27, 1990

[54] OPTICAL IMAGE TO VIDEO TRANSFER SYSTEM HAVING ENHANCED RESOLUTION AND CONTRAST FOR DARK AREAS OF THE IMAGE

[75] Inventors: Robert W. Easterly, Churchville; John R. Fredlund; Anthony W. Schrock, both of Rochester; Lawrence E. Walther, Macedon, all of N.Y.

[73] Assignee: Eastman Kodak Company, Rochester, N.Y.

[21] Appl. No.: 290,729

[22] Filed: Dec. 27, 1988

[51] Int. Cl.⁴ .............................................. H04N 3/14
[52] U.S. Cl. ........................... 358/213.16; 358/213.19; 358/163; 358/446; 358/168
[58] Field of Search ...................... 358/213.16, 213.19, 358/54, 214, 228, 168, 170, 139, 163, 446, 221

[56] References Cited

U.S. PATENT DOCUMENTS

| | | | |
|---|---|---|---|
| 4,408,231 | 10/1983 | Bushaw | 358/446 X |
| 4,551,762 | 11/1985 | Levine | 358/446 X |
| 4,638,350 | 1/1987 | Kato et al. | 358/228 X |
| 4,675,549 | 6/1987 | Steffe et al. | 358/213.16 X |
| 4,688,099 | 8/1987 | Funston | 358/54 X |
| 4,786,969 | 11/1988 | Souji et al. | 358/213.16 X |
| 4,811,105 | 3/1989 | Kinoshita et al. | 358/213.16 X |
| 4,819,071 | 4/1989 | Nakamura | 358/213.16 |
| 4,839,729 | 6/1989 | Ando et al. | 358/163 X |
| 4,843,476 | 6/1989 | Fujioka et al. | 358/213.19 |

Primary Examiner—James J. Groody
Assistant Examiner—Mark R. Power
Attorney, Agent, or Firm—James A. Smith

[57] ABSTRACT

The translation of an optical image into video signals by a video sensor illuminated by the optical image is adjusted by illuminating the sensor at a first level of light intensity sufficient to provide the video signals at maximum amplitude while adjusting the amplitude of the video signals to a first level, and then illuminating the sensor at a second reduced level of light intensity while adjusting the black level of the video signals so that the black level is at least equal to the amplitude of the signals produced by the sensor in the absence of illumination.

20 Claims, 19 Drawing Sheets

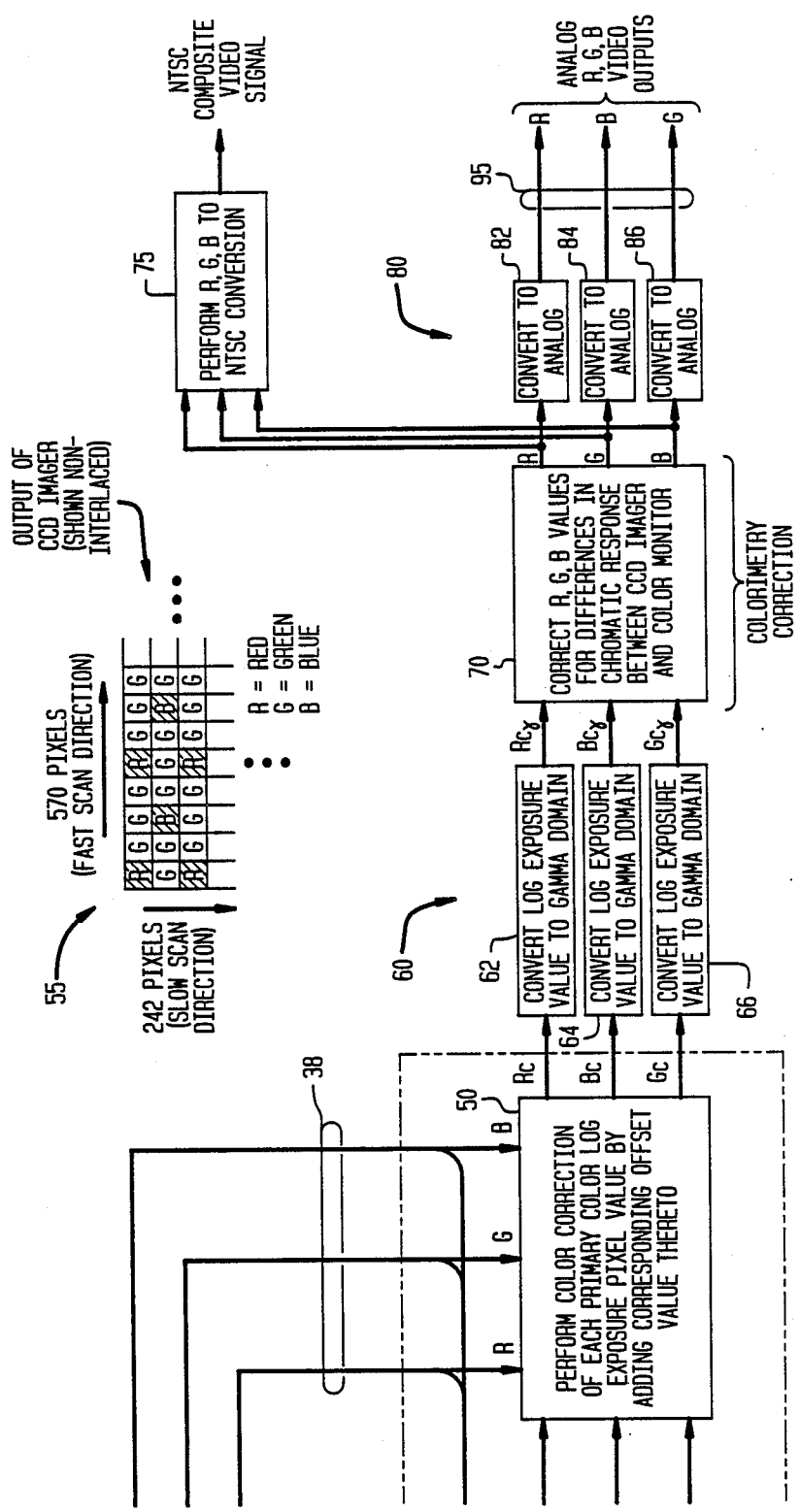

| FIG. 2A | FIG. 2B | FIG. 2C | FIG. 2D |

FIG. 5A
FIG. 5
| FIG. 5A | FIG. 5B | FIG. 5C | FIG. 5D |
|---|---|---|---|
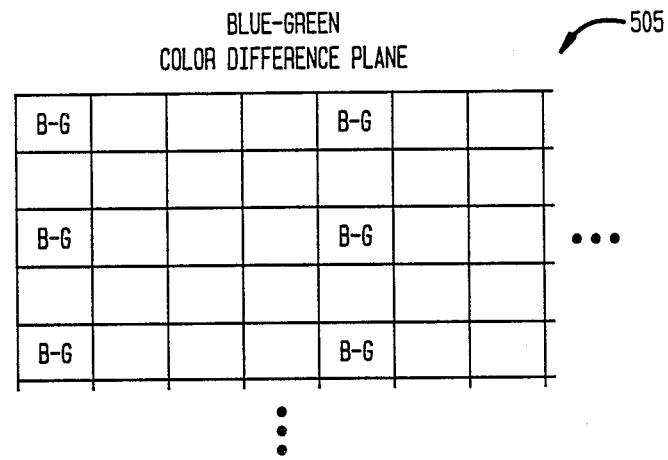
BLUE-GREEN COLOR DIFFERENCE PLANE — 505
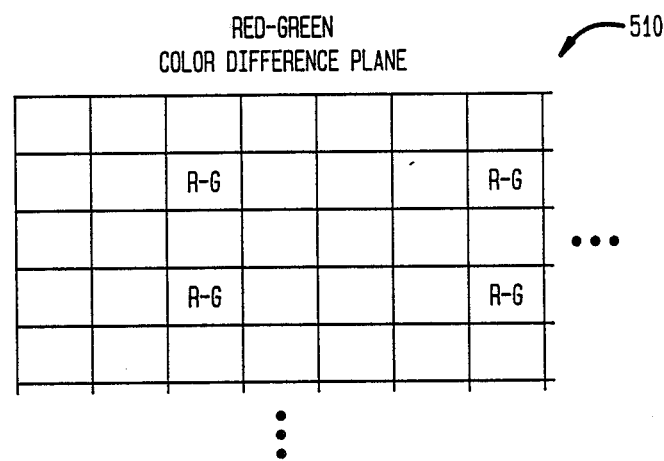
RED-GREEN COLOR DIFFERENCE PLANE — 510
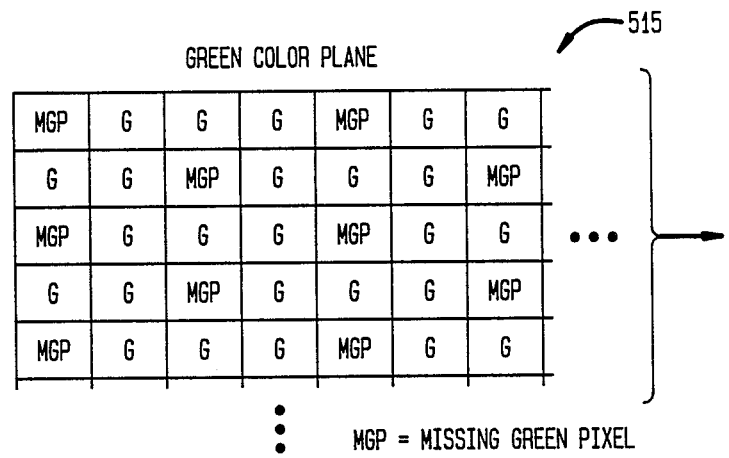
GREEN COLOR PLANE — 515
MGP = MISSING GREEN PIXEL

VI = VERTICALLY INTERPOLATED VALUE

VERTICAL INTERPOLATION

FIG. 5C

HORIZONTALLY INTERPOLATED BLUE-GREEN PLANE — 535

| 536 | 537 | 538 | 534 | 539 | | | |
|---|---|---|---|---|---|---|---|
| B-G → | .75 (B-G)HI | .5 (B-G)HI | .25 (B-G)HI | B-G → | .75 (B-G)HI | .5 (B-G)HI | ... → |
| (B-G)VI ↓ | .75 → | .5 → | .25 → | (B-G)VI ↓ | .75 → | .5 → | |
| B-G → | .75 | .5 | .25 | B-G → | .75 | .5 | ... → |
| (B-G)VI ↓ | .75 → | .5 → | .25 → | (B-G)VI ↓ | .75 → | .5 → | |
| B-G → | .75 | .5 | .25 | B-G → | .75 | .5 | |

HORIZONTALLY INTERPOLATED RED-GREEN PLANE — 540

| .5 (R-G)HI | .75 (R-G)HI | (R-G)VI ↓ | .25 (R-G)HI | .5 (R-G)HI | .75 (R-G)HI | (R-G)VI ↓ | |
|---|---|---|---|---|---|---|---|
| ← .5 | .75 | R-G ← | .25 | .5 | .75 | R-G ← | ... → |
| ← .5 | .75 | (R-G)VI | .25 | .5 | .75 | (R-G)VI | |
| ← .5 | .75 | R-G ← | .25 | .5 | .75 | R-G ← | |
| ← .5 | .75 | (R-G)VI | .25 | .5 | .75 | (R-G)VI | |

544  543  546  542

HI = HORIZONTALLY INTERPOLATED VALUE

⎧———————— HORIZONTAL INTERPOLATION ————————⎫

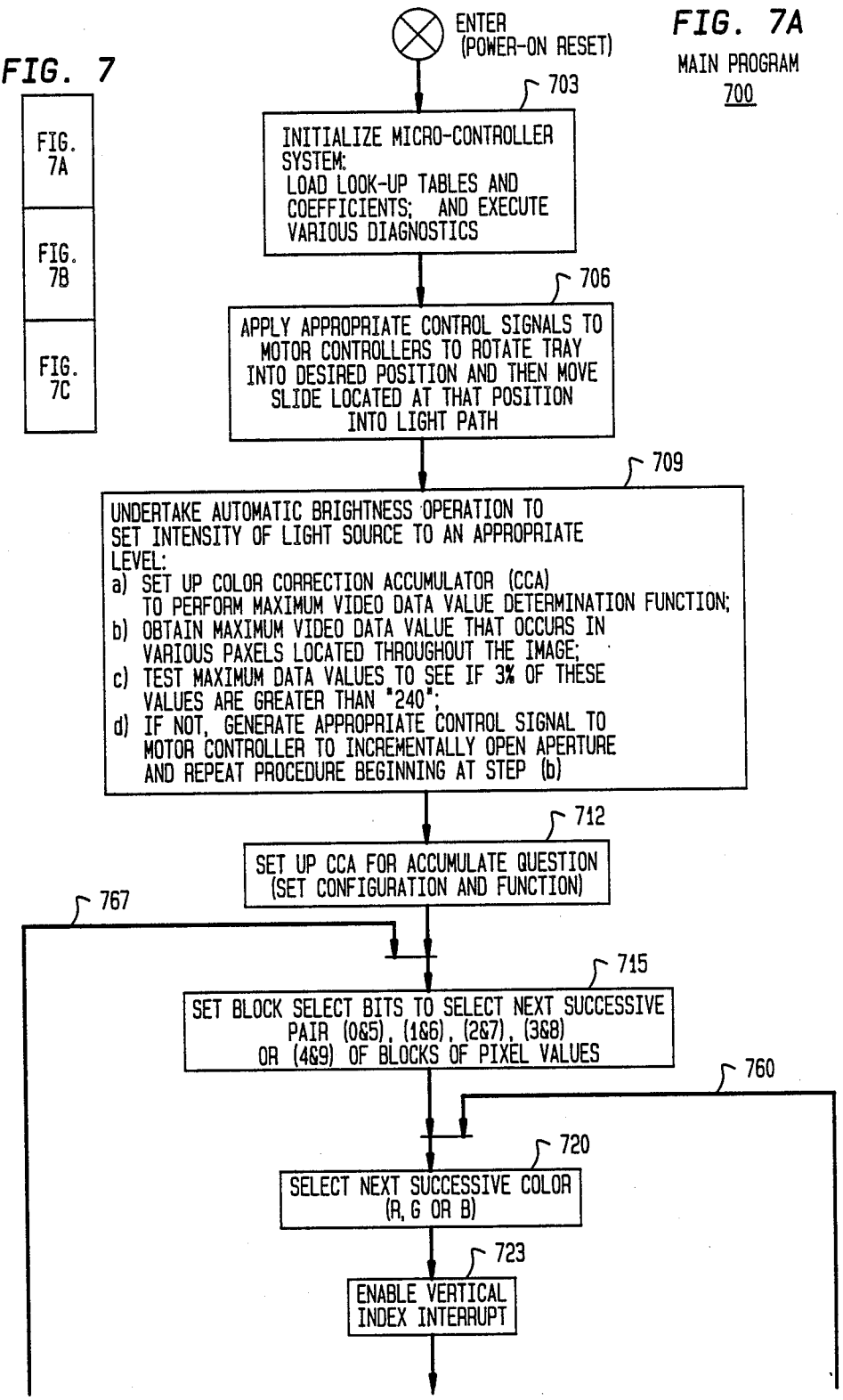

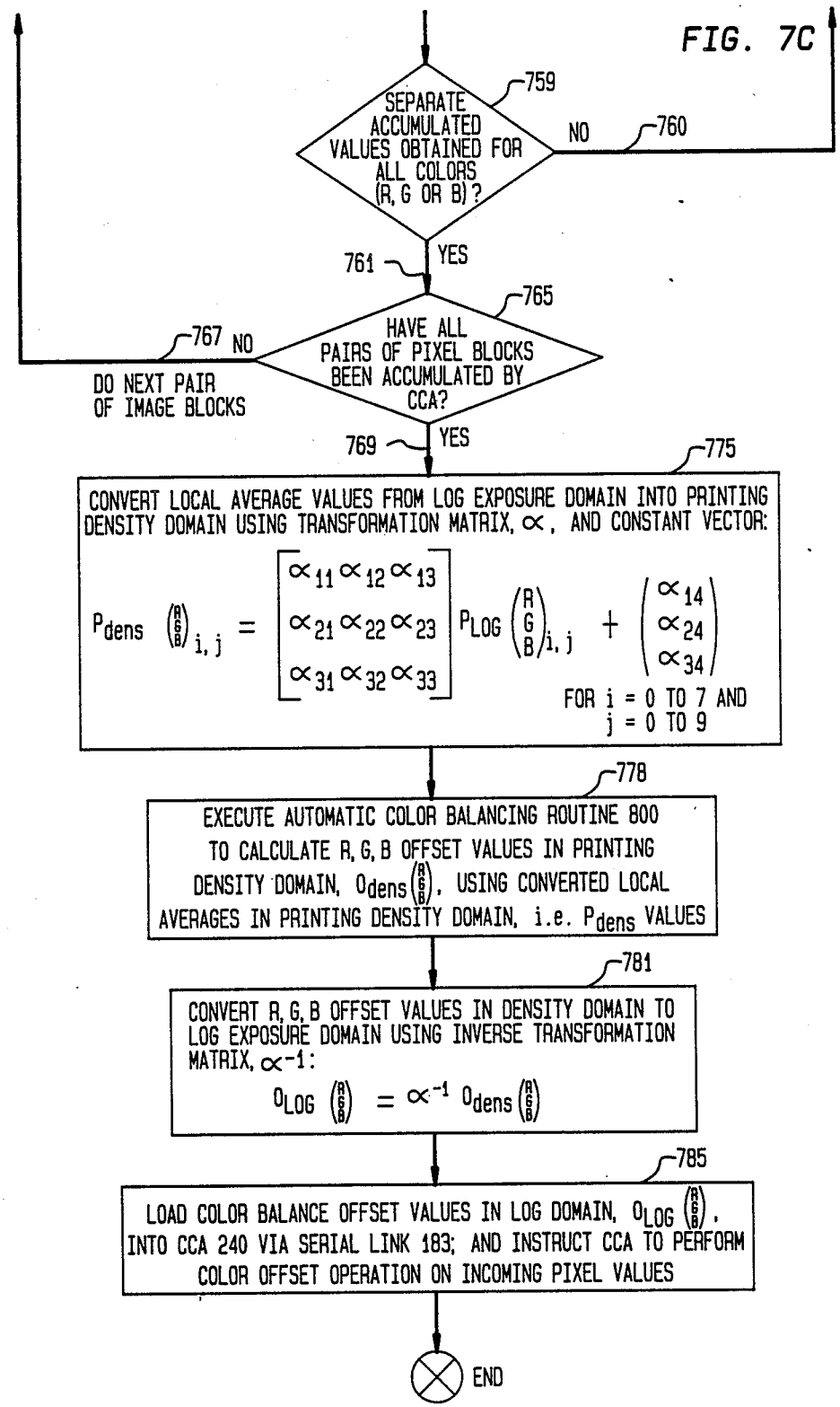

FIG. 8  AUTOMATIC COLOR BALANCING ROUTINE 800

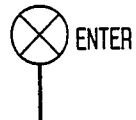 ENTER

810 — CONVERT EACH DENSITY DOMAIN LOCAL AVERAGE VALUE $P_{dens}\binom{R}{G}{B}i,j$ FROM R, G, B COLOR SPACE TO A DIFFERENT COLOR SPACE, i.e. NEUTRAL (NEU), GREEN-MAGENTA (GRM) AND ILLUMINANT (ILL):
$NEU(i,j) = f_1(R(i,j), G(i,j), B(i,j))$
$GRM(i,j) = f_2(R(i,j), G(i,j), B(i,j))$
$ILL(i,j) = f_3(R(i,j), B(i,j))$

820 — DETERMINE NEUTRAL TRANSFER DENSITY (TDNEU) AS A PRE-DEFINED FUNCTION, $f_4$, OF THE MAXIMUM, MINIMUM AND/OR AVERAGE VALUES OF THE NEUTRAL, RED AND BLUE LOCAL AVERAGE VALUES (FOR i = 0 TO 7 AND j = 1 TO 8)

830 — DETERMINE GREEN - MAGENTA TRANSFER DENSITY (GRMTD) AND ILLUMINANT TRANSFER DENSITY (ILLTD) AS WEIGHTED AVERAGES OF PRE-DEFINED FUNCTIONS OF ALL GREEN-MAGENTA AND ILLUMINANT LOCAL AVERAGES:
$GRMTD = $ WEIGHTED AVERAGE $\{f_5(GRM(i,j), ILL(i,j))\}$
$ILLTD = $ WEIGHTED AVERAGE $\{f_6(GRM(i,j), ILL(i,j))\}$
WHERE i = 0-7 AND j = 0-9

840 — DETERMINE RED, GREEN AND BLUE OFFSET VALUES $O_{dens}\binom{R}{G}{B}$ IN PRINTING DENSITY DOMAIN AS PRE-DEFINED FUNCTIONS OF NEUTRAL, GREEN - MAGENTA AND ILLUMINANT TRANSFER DENSITIES:

$O_{dens}(R) = f_7 (NEUTD, GRMTD, ILLTD)$
$O_{dens}(G) = f_8 (NEUTD, GRMTD)$
$O_{dens}(B) = f_9 (NEUTD, GRMTD, ILLTD)$

 RETURN

OPTICAL IMAGE TO VIDEO TRANSFER SYSTEM HAVING ENHANCED RESOLUTION AND CONTRAST FOR DARK AREAS OF THE IMAGEcl

DESCRIPTION

The present invention relates to a system (method and apparatus) for transferring of optical images to video images which may be recorded on a video recording medium or displayed on a video monitor, and particularly to a optical image to video transfer system having a video signal to light intensity response characteristic which enables transfer of dark areas of an optical image with improved fidelity such that portions of the optical image which are dark or in shadow are discernible in the video image.

The invention is especially suitable for use in a film to video transfer system, which produces color video images for recording or display on a color video monitor, which is described in United States patent application Ser. No. 267,867 filed Nov. 7, 1988 in the name of David R. Cok and entitled "Apparatus and Accompanying Methods for Achieving Automatic Color Balancing in a Film to Video Transfer System." This application is assigned to the same assignee as the present application. The invention of this application will also be applicable for calibrating the response characteristic (light intensity to sensor voltage output) of CCD and other video cameras and their associated systems, for other purposes and for use in other system in addition to that of the above-referenced patent application.

The system described in the above identified patent application has facilities for illuminating a CCD video camera with a photographic image projected thereon as from a slide having a color transparency. The light is projected through a variable area aperture, in the form of a motor driven iris, so that the light intensity of the illumination can be varied. The video signals from the CCD camera are processed in an analog signal processor wherein the luminance of the white level of the video image, as well as of its black level, can be set. The video signals are digitized on a pixel by pixel basis. Digitized pixel signals are produced as successive lines of a field are scanned.

The digitized image is then digitally signal processed under computer control. The video signals are separated into their red, blue and green (RGB) components in a color difference interpolater and then applied to a color correction accumulator (CCA), which under computer control can store the digital values of each of the three color fields, correct the color balance and density therein, and output color corrected RGB data for each field. The CCA can also accumulate (sum the values) of groups of the digital pixel signals.

For data reduction purposes, the CCA under computer control and with timing signals, which provide for synchronous supply of the pixel data, handles the data from paxels. Paxels are contiguous zones of a field containing segments of the horizontal lines of groups of consecutive horizontal lines. For example there may be 80 paxels in a field consisting of 560 pixels per line and 480 lines of pixels. In this example, the paxels are an array, ten across and eight down in rectangular coordinates.

The CCA accumulates the values of the digital pixel signals in each line of each paxel. In the case where there are 80 paxels and 60 lines per paxel, 4800 values are accumulated on a paxel basis. These values are used for color correction purposes as described in the above identified patent application. They are also used in accordance with this invention for adjusting and thereby calibrating the optical intensity to video signal transfer characteristics of the system to obtain a quality video image upon transfer even in the dark or shadow areas of the optical image.

It is, therefore, an important feature of the invention to utilize, in large part, the facilities of the film to video transfer system as described in the above identified patent application for calibration purposes, and particularly for video signal to light intensity response characteristic calibration.

Each color corrected output channel from the CCA (the RG&B channels) is adjusted for spectral differences in a color cross talk matrix, and then converted from log values to linear values in a log to gamma converter. The channels are then translated into analog form. The RGB analog video channels may be used to display the image in a video monitor or encoded into NTSC composite color TV signals.

While the above described film to video transfer system provides video, and particularly television signals, of such a character and in such a manner that the operator can compose faithful and/or enhanced versions of the photographic image in an electronic video display, the system must be calibrated to accommodate the optical intensity to video signal response characteristic of the sensor. This characteristic is calibrated by adjusting the white and black levels of the video signal by controlling the gain and black level in the processing of the analog video signals from the sensor. Analog signal processing involves signal conditioning, including amplification. The gain or amplification is used to calibrate and set the white level of the signal. The black level is obtained by off setting or shifting the signal level. At low voltages corresponding to black areas of the image, the video signal will be set to black level.

These adjustments have heretofore been made utilizing an oscilloscope on which the video output signals were displayed. The gain and black level controls of the analog signal processor were set while observing the video signal at high and zero illumination conditions.

As will be apparent from FIG. 2, which shows the optical intensity to video signal response (transfer characteristic) in terms of the voltage at the output of the sensor, if the optical image to video signal transfer characteristic were linear, faithful optical to video transfer over the full light intensity range would be possible. Such a linear signal would result in a linear variation in output voltage as the optical intensity varied between zero intensity and an intensity which would produce maximum output voltage from the sensor ($V_{MX}$). However, the characteristic is not linear. It is nonlinear at low intensity levels. It is believed that such nonlinearity results from thermal noise in the sensor. As the intensity is reduced, a point is reached where the voltage does not decrease, but remains constant. This is shown by the knee of the plot shown in full lines in FIG. 2. The linear characteristic would be achieved only if the full line curve were extended towards zero and had the continuation from the knee to the zero point shown by the short dash line. However, this is not the case in reality due to the electro-optic performance of the sensor.

To overcome the nonlinearity, it has been proposed to set the black level at zero sensor voltage output when the illumination of the sensor is zero (the light is turned off). This calibration results in a transfer characteristic which causes the loss of any resolution in dark or shadowed areas of the optical image. This is because the sensor output voltage remains at zero or black level until the light intensity increases to a level where sensor voltage is generated. The plot shown by long and short dashes indicates the offset transfer characteristic resulting when the black level is set at zero volts with light to the sensor turned off.

It has been discovered in accordance with the invention that when the black level is set so that it is at least equal to the amplitude of the signal from the sensor in the absence of illumination (the noise level), that the resolution of the video image in dark areas is enhanced and the overall quality of the video image is improved.

Accordingly it is the principal object of this invention to provide an improved system (method and apparatus) of adjusting the optical intensity to video signal transfer characteristic of a optical image to video signal transfer system by calibrating the levels corresponding to black and white luminance of the image upon electronic display.

It is a still further object of the present invention to provide an improved system for calibrating a film to video transfer system which utilizes the facilities of that system to obtain information on which the calibration can be based.

Briefly described, a system embodying the invention is operative to adjust the optical intensity to video signal transfer characteristic of the system which translates the optical image into video signals. These signals vary between levels corresponding to black and white luminance of the image upon electronic display. To carry out the invention, the sensor which converts the image into video signals, is illuminated at a first level of light intensity which is sufficient to provide the video signals at maximum amplitude (close to sensor saturation). Means are then provided for making a first adjustment in the amplitude of the video signals to provide such signals at a first amplitude while the sensor is being illuminated at the first level of light intensity. Then the level of intensity of illumination of the sensor is reduced to a second level. Second means are provided for adjusting the black level of the video output signal while the sensor is being illuminated at the second level of light intensity such that the black level video output signal is at least equal to the amplitude of the signal from the sensor in the absence of illumination. Suitably, the maximum amplitude is that amplitude which results in a digital signal of maximum value when the video signals are digitized. The video signal samples correspond to pixels of the image produced by the sensor as it scans successive lines of the image. The maximum amplitude is that amplitude which results in digital signals of maximum amplitude when the sensor is illuminated with light of an intensity obtained by an adjustment of the variable aperture area which provides the maximum digital signal value. This may be at sensor saturation. With this value of illumination intensity incident on the sensor, the illumination may be reduced to about 5% to 10% (10% being preferable) as by inserting a 1.0 neutral density filter in the path of the illumination to the sensor. Then the black level is adjusted so that it results in digital signal values 10% of maximum value. Preferably this is accomplished by averaging the accumulated values of each line in each paxel (4800 values in the above described case) and adjusting the gain and black level to achieve the maximum or 100% and black or 10% calibration points thereby providing a transfer characteristic which is calibrated in a manner such that enhanced response, particularly in dark areas of the image, is obtained.

The foregoing and other objects, features and advantages of the invention, as well as a presently preferred embodiment thereof, will become more apparent upon reading of the following description in connection with the accompanying drawings in which.

Figure 1:
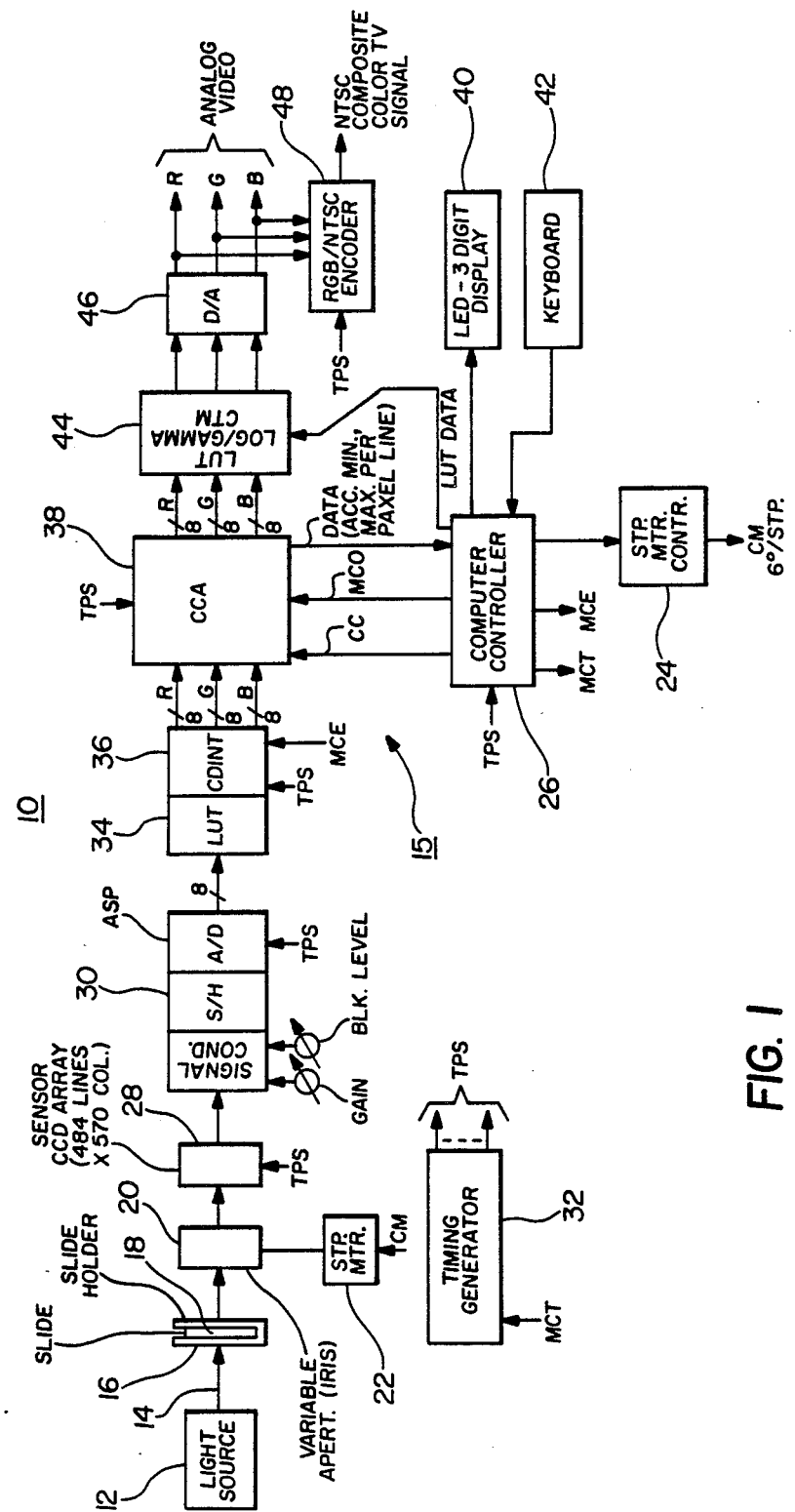
FIG. 1 is block diagram of a photographic image to video transfer system having the transfer characteristic adjustment facilities provided in accordance with the invention.
Figure 1A:
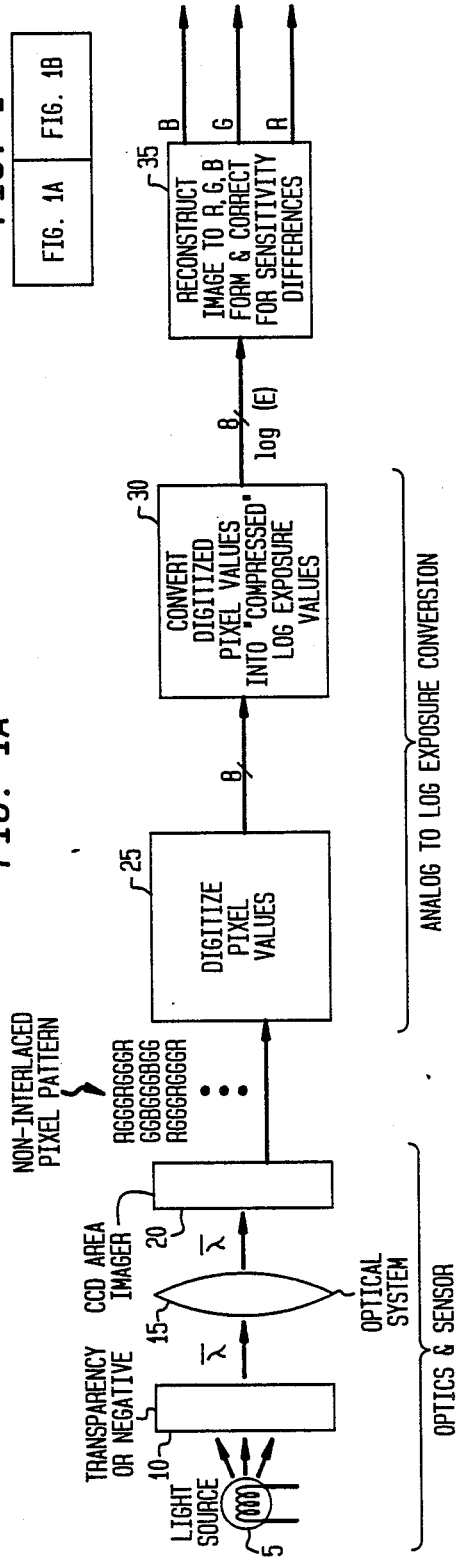
Figure 1A:
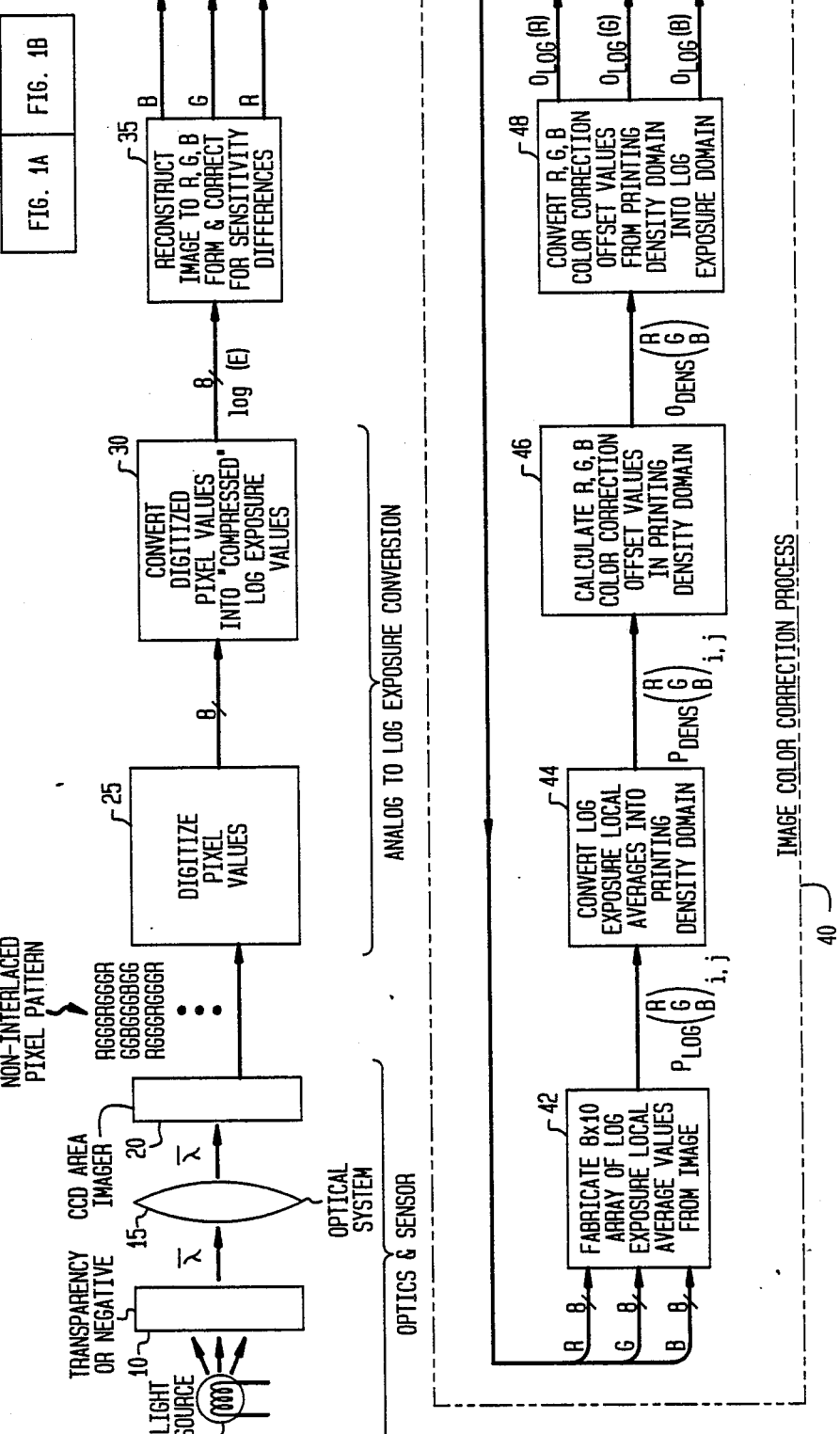

Referring more particularly to FIG. 1, there is shown a photographic image to video transfer system 10 substantially as shown and described in the above-identified U.S. patent application. The brief description of the drawings of the patent application and the detailed description thereof contained in an appendix to this description of the invention which may be referred to for further information.

A projection light source 12 which includes the necessary optics provides a beam of light, illustrated by the line 14, through a slide holder 16 which may receive a slide 18. The light source 12 and the slide holder 16 represent, diagrammatically, the light source and slide manipulating mechanism of a conventional carousel type slide projector. When the slide 18 is removed, the beam 14 is of maximum intensity. The beam then passes through a variable area aperture 20, which may be an iris which is controlled by a stepping motor 22. The stepping motor is operated by a stepping motor controller 24 which is controlled by signals from a computer controller 26. The computer controller may be implemented with a conventional microprocessor chip. The controller 24 and the stepping motor 22 are operative to either close or open the aperture in steps, suitably of six degrees, when commanded by step command pulse from the computer controller 26.

Intensity controlled illumination is then applied to the image sensing area of a video camera which has a CCD sensor array and associated electronics for scanning horizontal lines of pixels defined by the array and producing a video output signal which is applied to an analog signal processor ASP 30. The sensor 28 reads out the pixels at a very rapid rate, at least three times the color subcarrier frequency by pulses referred to by timing pulses (TPS) from a timing generator 32. The timing generator generates all necessary timing pulses from a frequency standard, such as a high frequency oscillator which is part of the timing generator 32. The operation of the timing generator is synchronized with the computer controller by control pulses (MCT) which are applied thereto. The timing generator generates a reset timing pulse which starts the scan at an upper corner of the image area, suitably the left hand corner of the image area. The image may be scanned in full resolution fields. These fields then contain each of the lines of pixels of the image or a frame may be constituted of two interlaced fields each having half the number of horizontal lines. The sensor in the herein illustrated system is by way of example described as having 484 lines of pixels arranged in 570 columns. The timing pulses from the generator 22 read out only 560 columns of 480 lines. The camera may ave a filter screen, suitably a so-called 3G screen which provided three times as many green pixel elements as red or blue elements. The resolution of the image is greatest in the green and the green field is preferably used for control purposes in accordance with the invention. For further information on the 3G pattern, see Weldy Kristy U.S. Pat. No. 4,663,661, Issued: May 5, 1987.

The analog signal processor 30 has a signal conditioning stage, a sample and hold (S/H) stage and a digitizing or analog to digital converter (A/D) stage. The signal conditioner includes an amplifier having an amplification or gain adjusting control and an off-set control. The gain control and the off-set controls may be provided by potentiometers in the amplifier circuits of the signal conditioner, as is conventional. In the ASP the pixels are sampled in synchronism with timing pulses and then digitized. The A/D may be a flash type converter circuit having an eight bit parallel output which provides digitized pixel signals with eight bit resolution.

In a digital signal processor 15 look-up tables 34 (LUT) are used to convert the digital pixel signals so that their codes vary with amplitude logarithmetically rather than linearly. The Processor 15 includes a color difference interpolator 36 (CDINT) which compares and weights the red, green and blue pixels, which are identified by timing pulses applied to the interpolator, into red, green and blue (RGB) channels. The CDINT may also have control signals MCE for enhancement and coring levels applied thereto. Digital signals corresponding to the pixels of each field are read into a color correction accumulator 38 (CCA) under control of timing pulses from the generator 32 and are latched therein.

The CCA 38 is controlled by the computer 26 to read into the computer controller 26 data. The data is read by the computer controller on DATA lines from the CCA 38 which supply the data to the computer controller 26 on a paxel basis. Each field in this example has 80 paxels. The array of 560 columns by 480 lines is divided into 10 paxel columns and groups of 60 lines per field. Data from two paxel columns are read in for each field which is scanned. Thus, in this example, five fields are required to transfer data for all 80 paxels. The CCA contains registers which store the sum of the digital paxel signal values for each line of each paxel. Since there are 80 paxel, 480 accumulated values are read into the computer controller. An accumulator may be provided in the CCA in the form of a register having a 30 bit capacity. After each 56 paxel line is accumulated the eight most significant bits are read via the data line into the computer controller 26. In other words, data is supplied to the computer controller on a line segment basis and the computer controller constructs the paxel values from these line segment values.

The CCA may also be controlled by commands from the computer controller (MCO) to select the minimum or maximum digital pixel signal per paxel line and 4800 such values per field may be stored in the computer controllers memory. These 4800 accumulated or sum values are averaged by a division process (summed and then divided by 4800) in the computer controller to provide average values of the pixel signals per field. The percentage of the pixels which are above a certain maximum value or below a certain minimum value may also be computed and used for brightness control purposes after the intensity to output signal voltage response (transfer characteristic) is calibrated in accordance with this invention.

The computer controller also has an LED three digit display 40, which may be used to display the average values per field, and a control keyboard 42. This keyboard may be used to command the computer to generate various types of control signals, for example for controlling zoom, tilt and other composing functions, which may be used to compose the image which is being transferred from optical to video form by the system 10.

Color correction (balance and density) data may be applied to the CCA for color correction purposes. Alternatively, the color correction codes may be inputted as data to look up tables 44 which are adapted to provide log to gamma conversion. These look-up tables 44 may be followed b cross talk matrices (CTM) for spectral balancing of the colors in each color channel. The look-up tables and cross talk matrices provide three channels of output data to digital to analog converters 46 (D/A) (one for each channel). Analog video RGB outputs are produced which may be used directly in color monitors or recorders or converted by a RGB/NTSC encoder 48 into NTSC composite color TV signals. This encoder also receives timing pulses which provide blanking, sync and other pulses. The timing pulses are generated in the timing generator 32.

Figure 3:
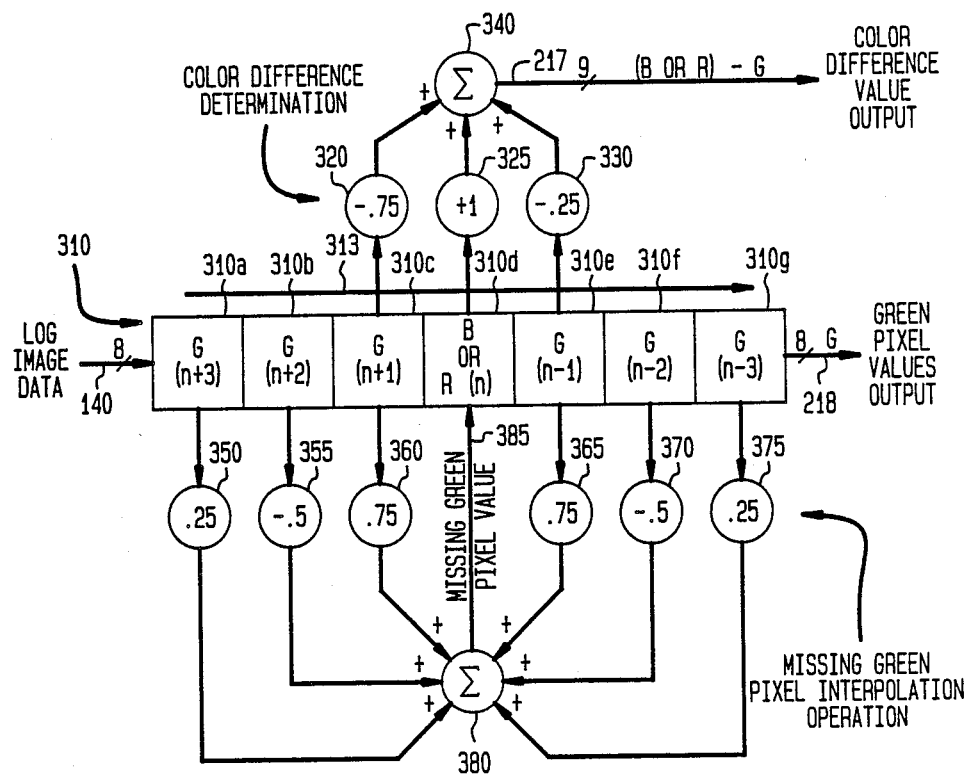
FIG. 3 is a flow-chart illustrating the Programming of the computer controller of the system shown in FIG. 1 when operative to implement the optical intensity to video signal transfer characteristic calibration in accordance with the invention.
Figure 4:
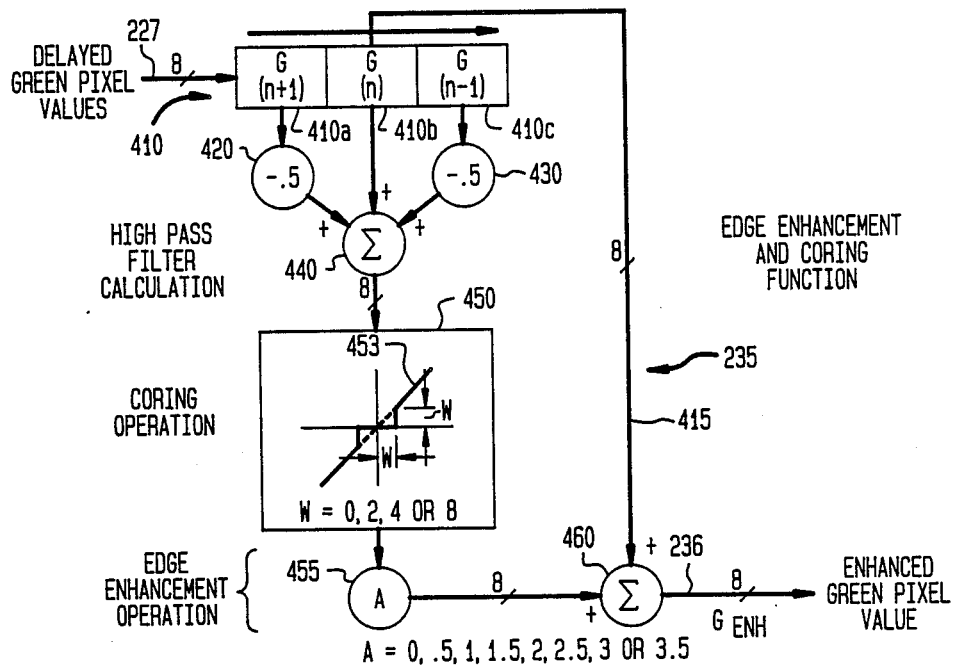
Figure 5B:
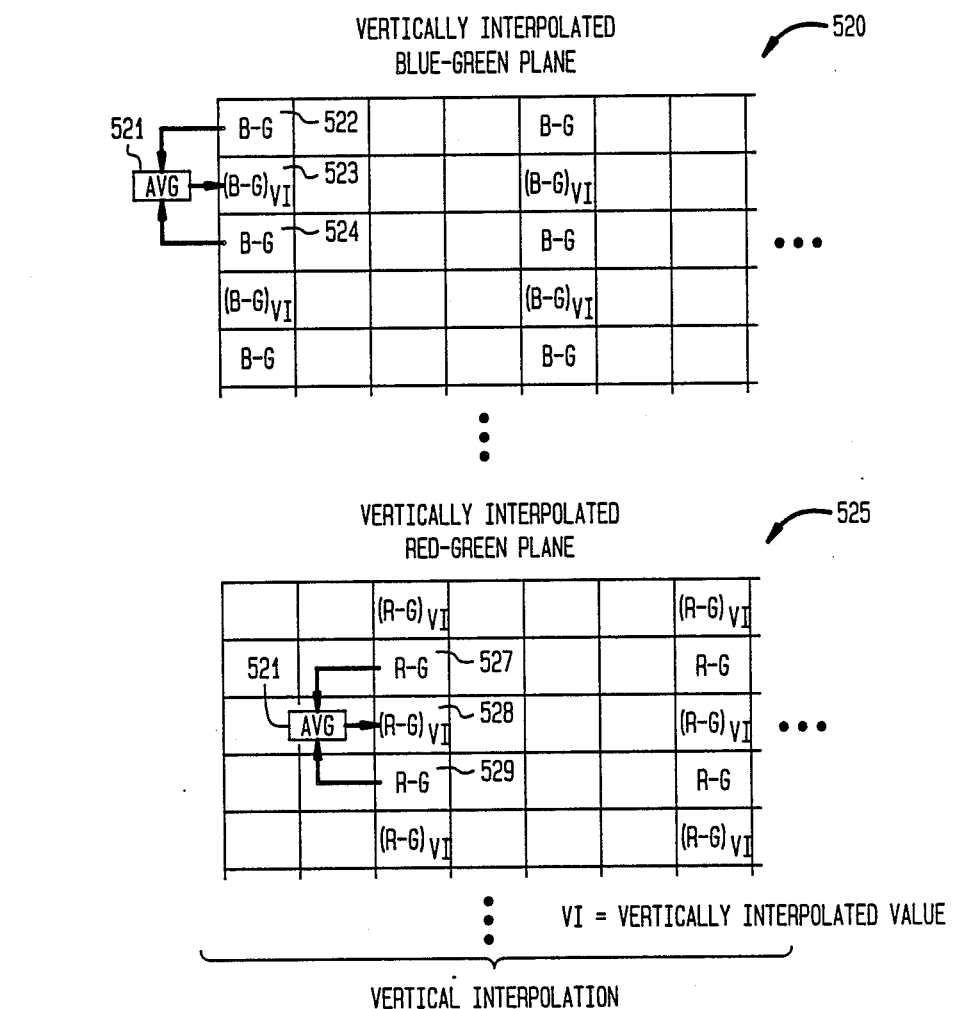
Figure 5B:
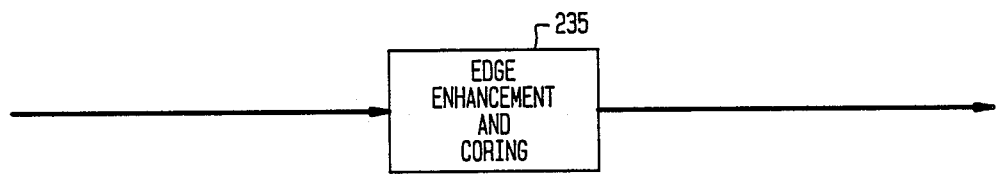
Figure 5D:
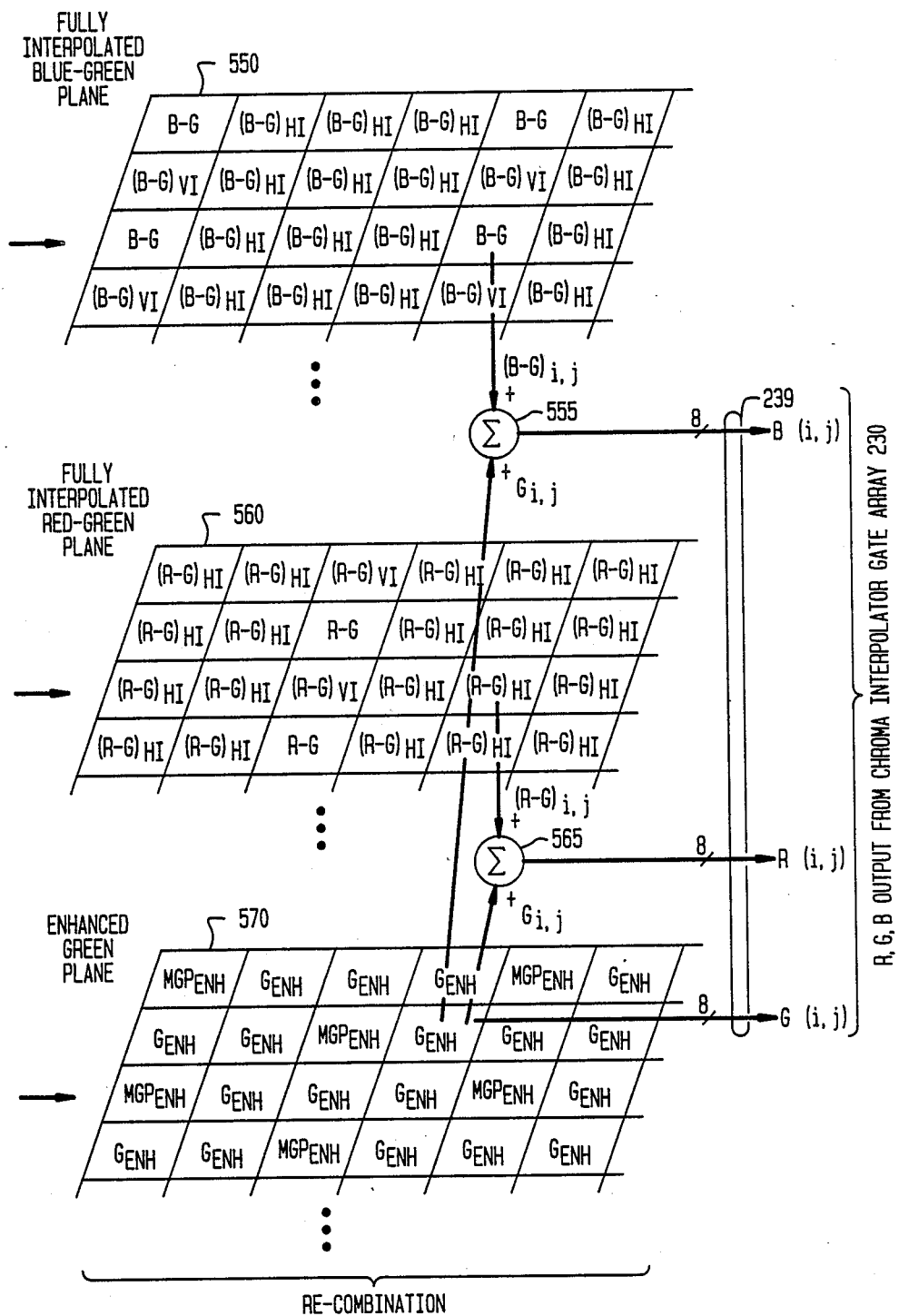
Figure 6A:
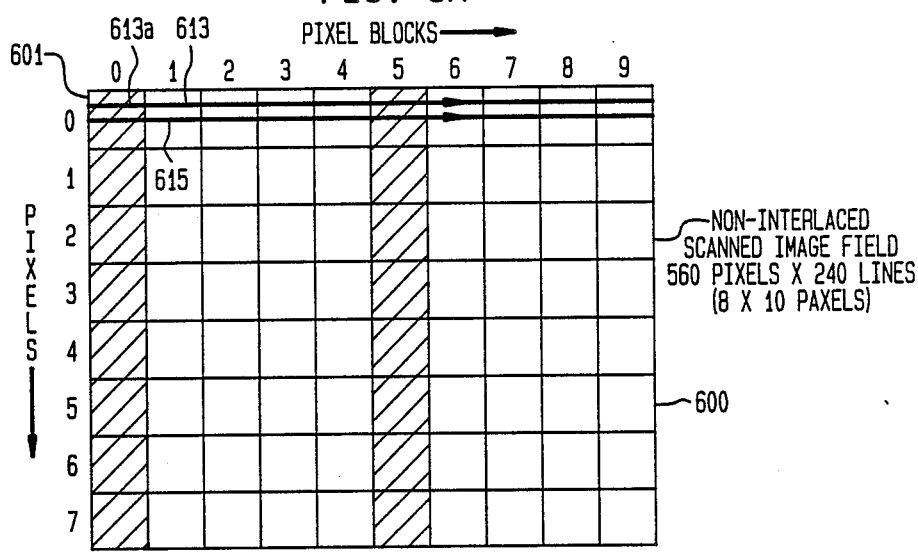
Figure 6B:
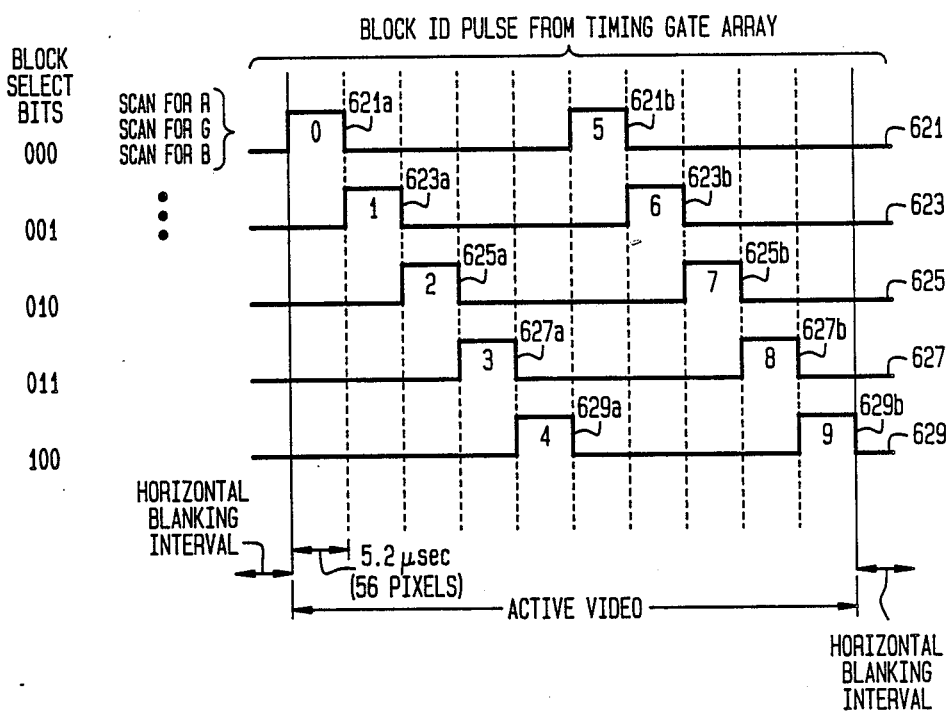
Figure 6C:
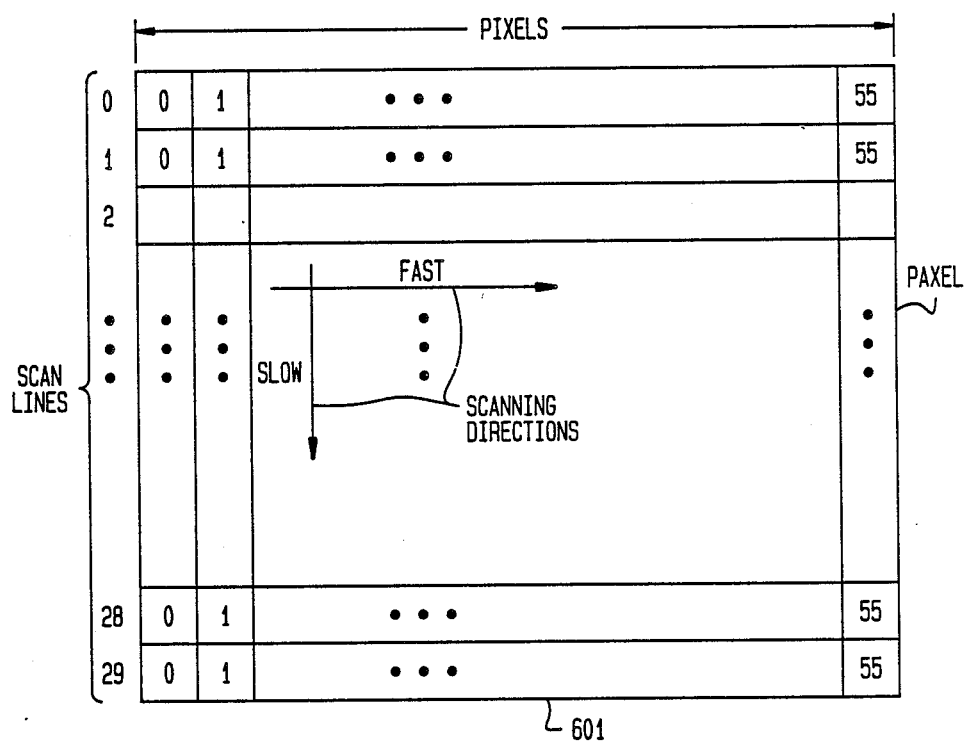
Figure 7B:
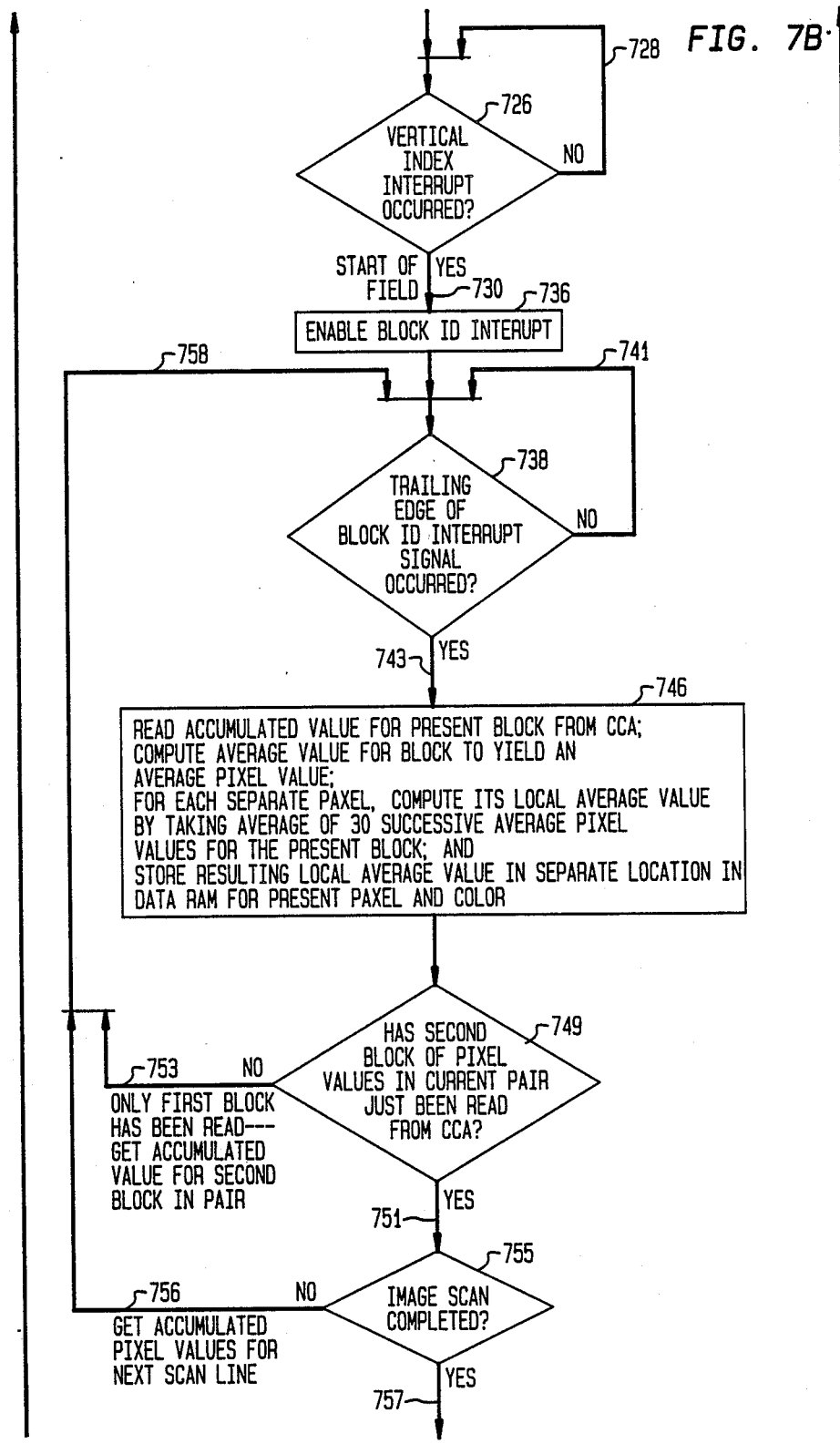
Figure 1:
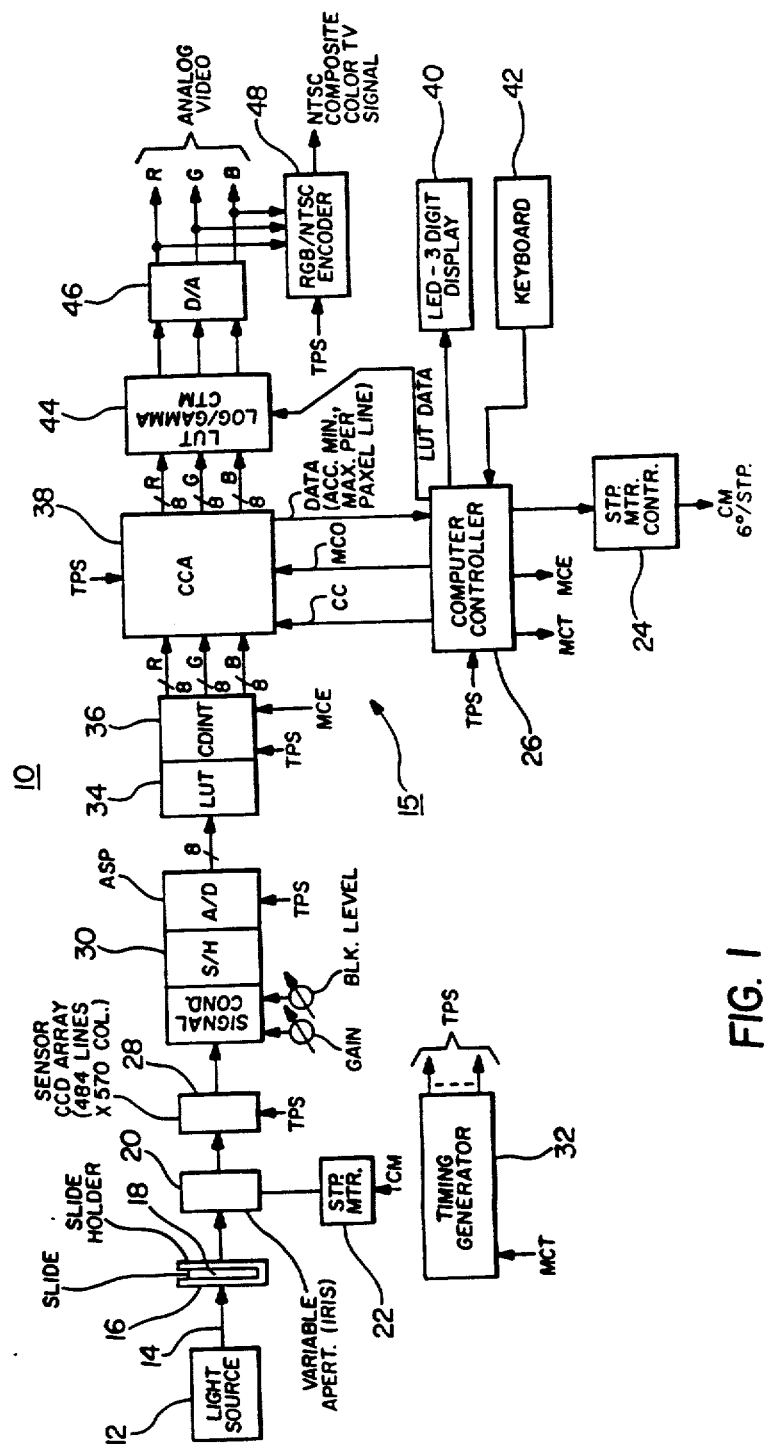
Figure 2:
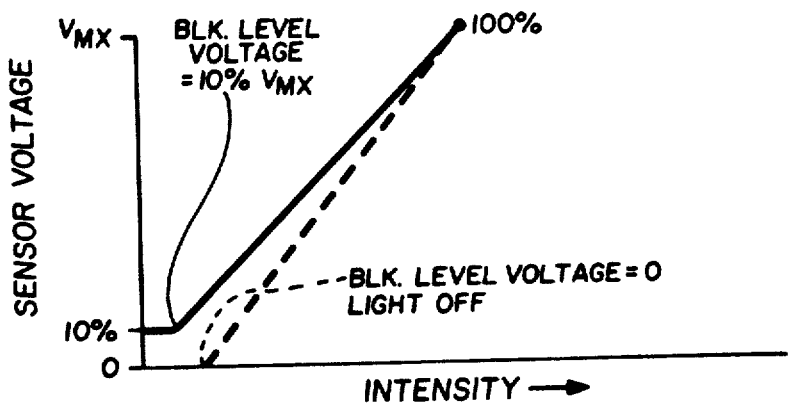
Figure 3:
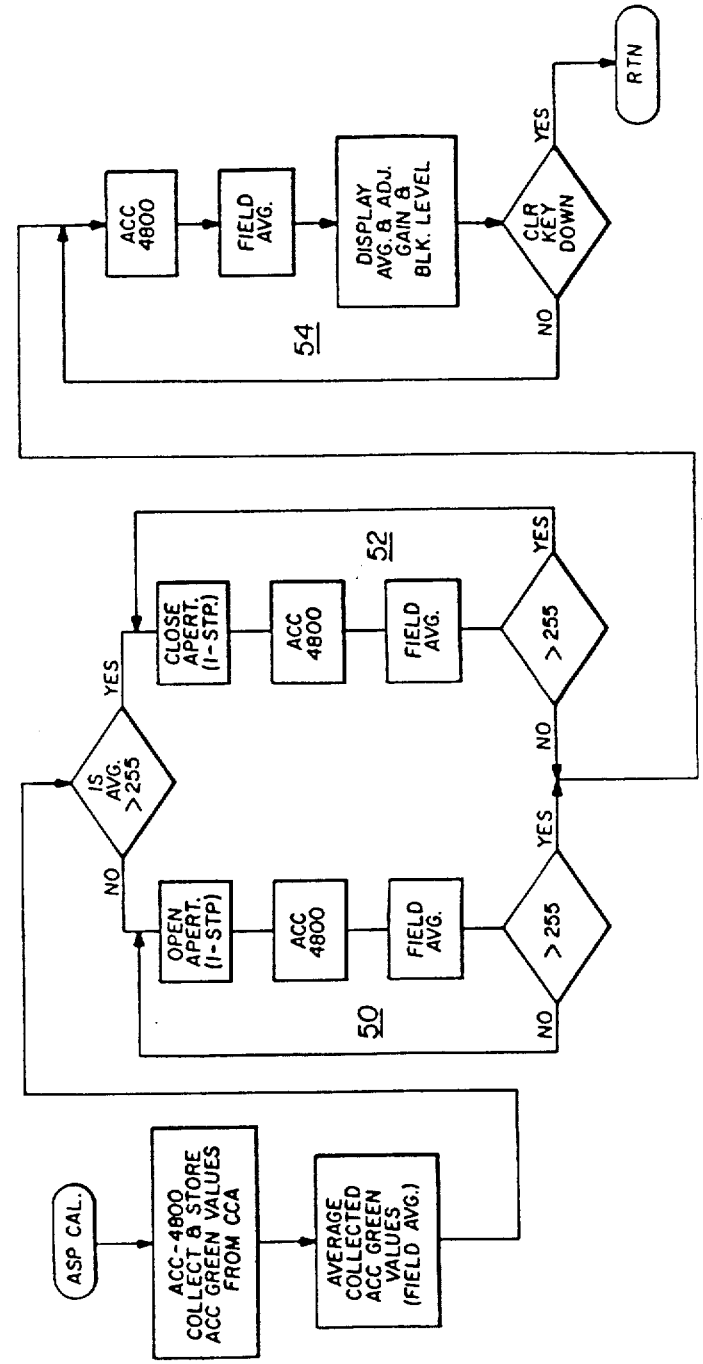

In order to provide calibration and set the color transfer characteristics, the computer controller 26 is operated in accordance with the ASP (Analog Signal Processor) calibration routine shown in FIG. 3. In accordance with this program, the computer controller collects and stores 4800 green values from the CCA. This storage is done on a paxel basis as discussed above. Then the 4800 values, which are collected and stored, are averaged so as to provide a field average value. It will be recalled that the maximum value of the binary 8 bit signal is 255 in decimal. The computer controller compares the field average with 255 and provides decision outputs as to whether the average is greater than 255. The decision output is used in iterative loops, as shown at 50 and 52 in FIG. 3 so as to open the aperture 20 or close it until the illumination intensity is such that the video signal is at maximum amplitude; maximum amplitude being that amplitude which will provide digital signals of maximum value or 255 decimal. It will be appreciated that the system is operated with the slide 18 removed when the illumination is being controlled so as to maximize the output amplitude. By virtue of the use of the field averages, the illumination is adjusted so that it is sufficient to produce maximum amplitude output signals with the sensor 28.

Next the gain and black level are controlled using the loop 54. With maximum illumination applied to the sensor, another group of fields are converted into paxels and 4800 ACC or accumulated values (sums from the accumulator of the CCA) are collected and averaged. This field average is displayed on the display 40. The gain control of the signal conditioner of the ASP 30 is then adjusted so as to provide a predetermined output level. Suitably, this level is the maximum level so that the display reads 255.

If desired, not all paxel values have to be used to determine the average video value which is presented on the display. Only the central 32 out of 80 paxels can be used, i.e., 4 on the 2nd line, 6 on the 3rd to 6th line and 4 on the 7th line.

Figure 2:
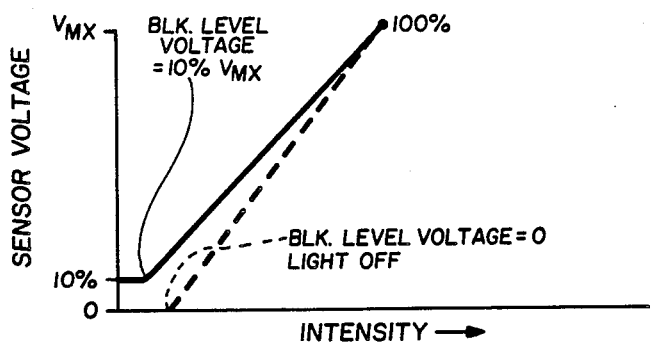
FIG. 2 is a plot of the optical signal to video signal transfer characteristics of th signal when calibrated in different respects as discussed above.
Figure 2A:
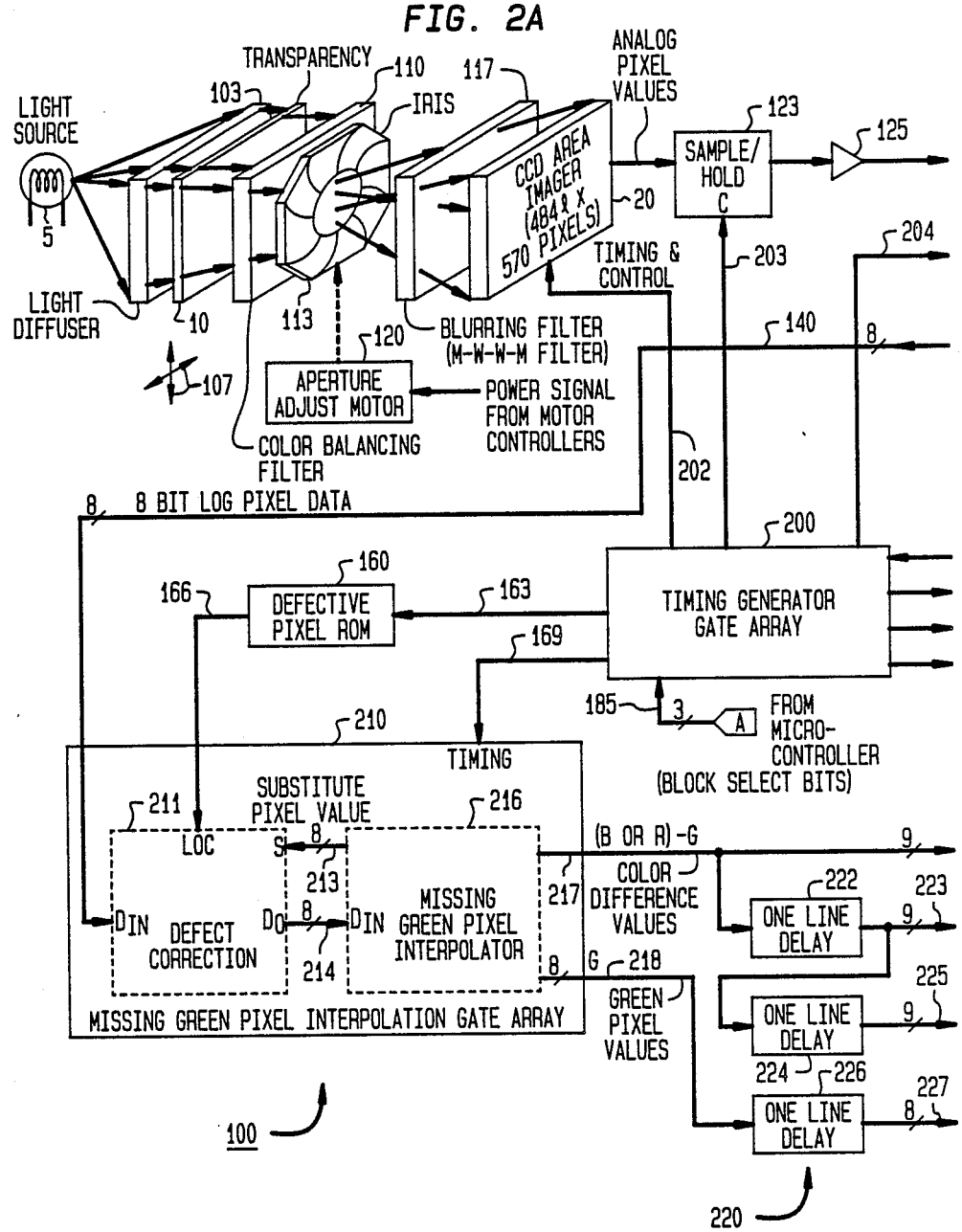
Figure 2:
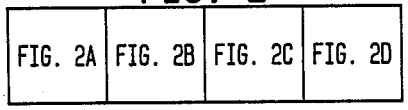
Figure 2B:
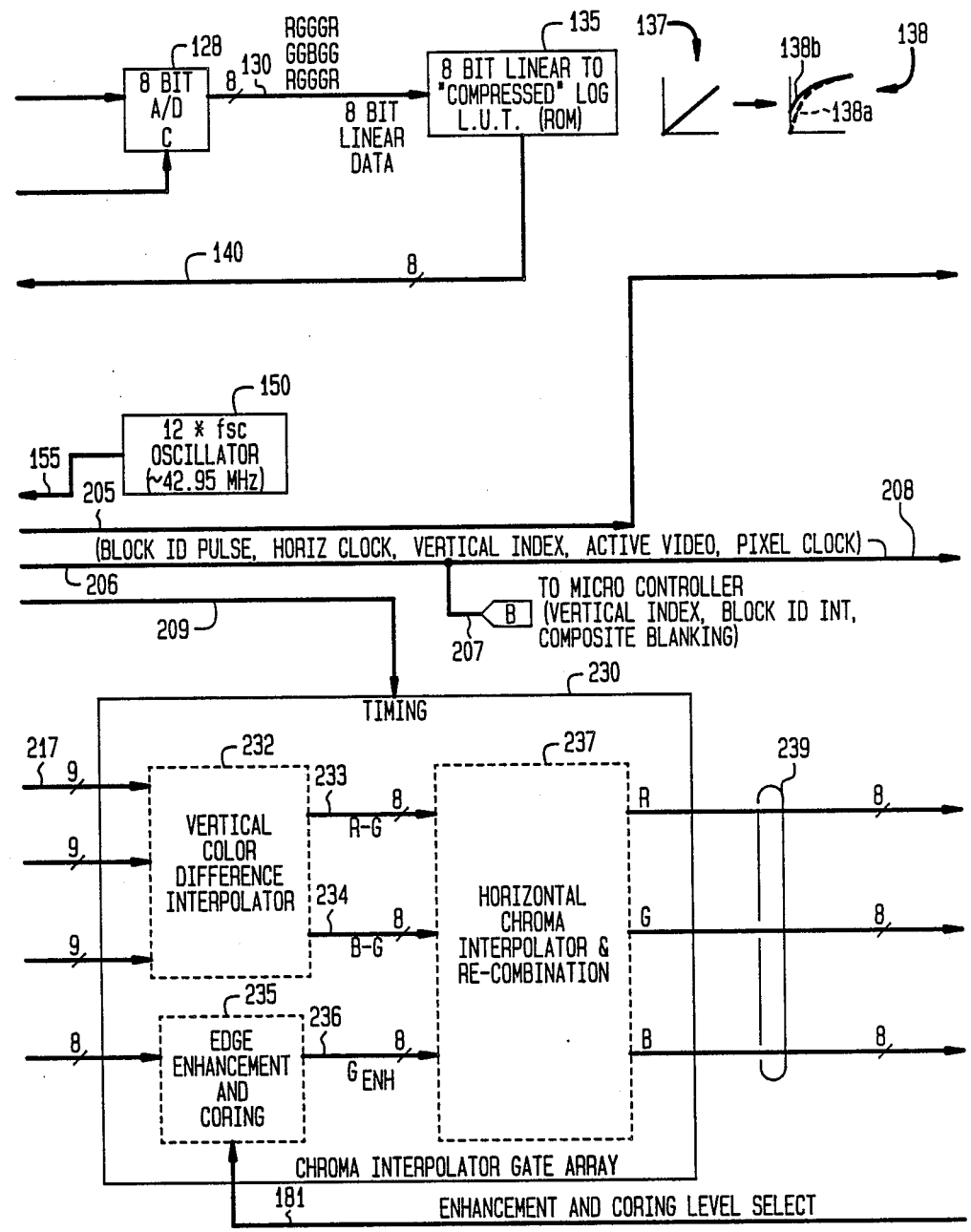
Figure 2C:
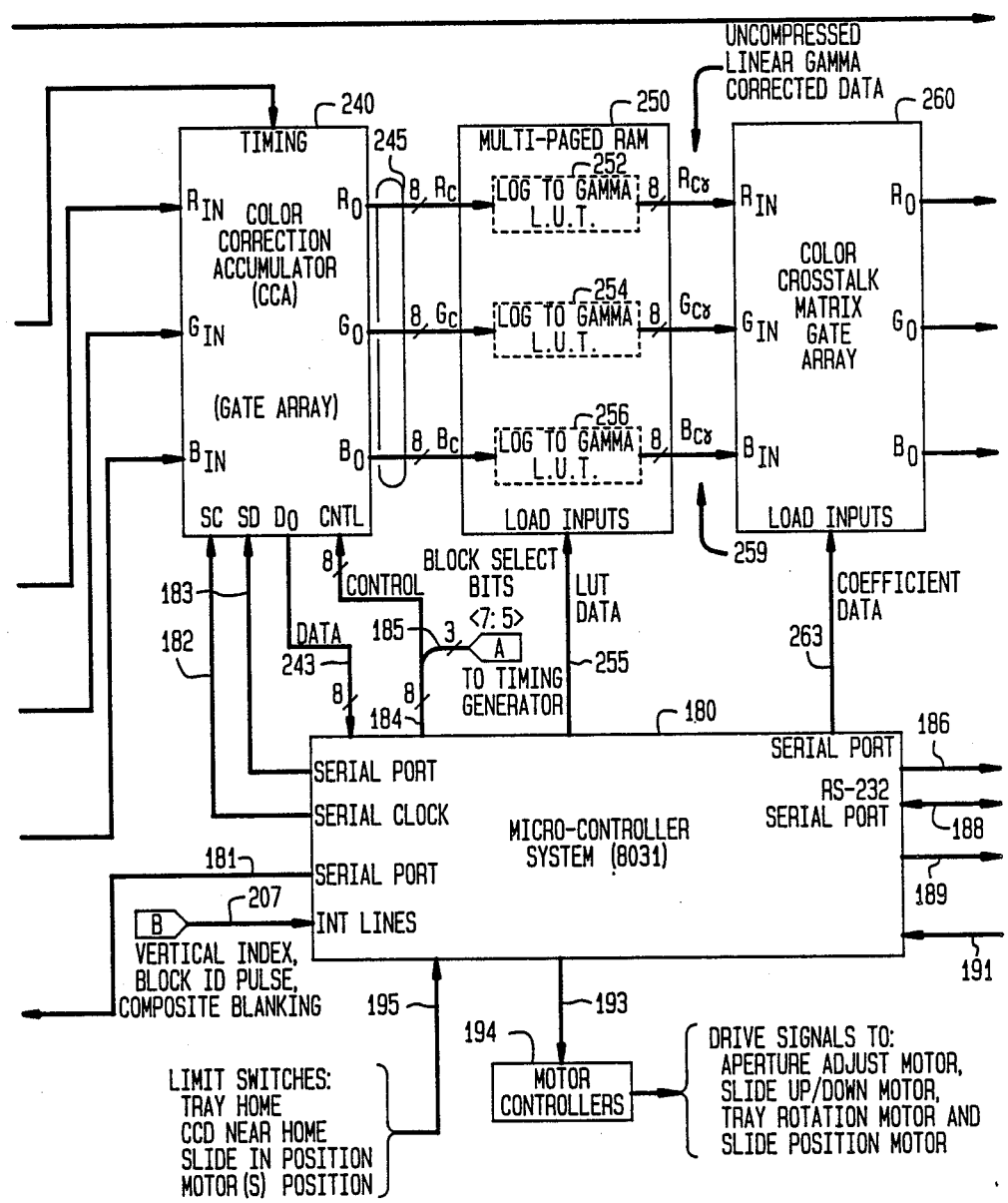
Figure 2D:
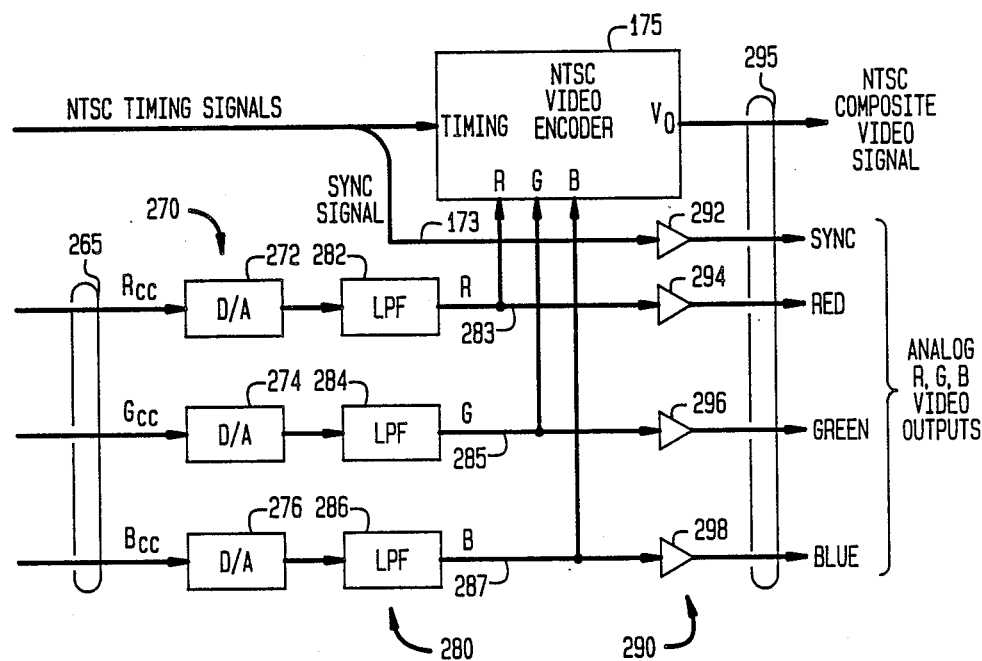
Figure 2D:
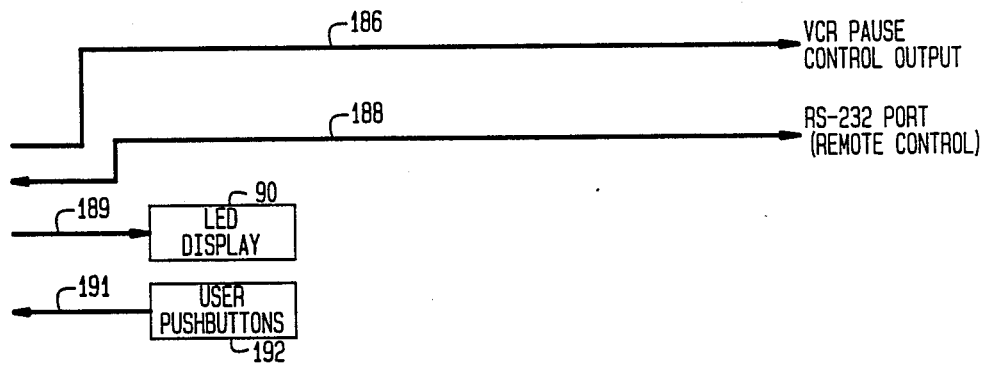

For black level adjustment, ten percent of the illumination is allowed to the incident on the sensor 28. This amount of illumination is at least equal to the illumination intensity at the knee of the solid line plot shown in FIG. 2. This intensity produces output signals at least equal to those produced in the absence of illumination due to noise in the sensor. A ten percent reduction in illumination has been found suitable and this reduction of illumination may be obtained by inserting into the slide holder 18, a slide having a 1.0 neutral density filter (NDFLT). With the neutral density filter inserted, the black level is controlled until the field average value is ten percent of the maximum value when the gain was calibrated, i.e., 25.5. In order to provide a resolution where the last digit is in tenths, a floating point shift is provided in accordance with conventional display controlled techniques in the computer controller 26. With the 1.0 NDELT in place, the black level is adjusted until the three digit display reads 25.5. Of course, a signal amplitude with some other value, for example, 200, may be used and may be preferable to avoid clipping induced errors. Then the black level adjustment is made until the field average is twenty as read on the display 40.

After calibration, the clear on the keyboard 42 is depressed and the program returns. Until the clear key is down, the loop 54 continues to operate and the display continues to read the field average. After the transfer characteristic of the system is calibrated variations from sensor to sensor are removed and the resolution of the video image from the dark shadowed areas of the optical image on an actual slide becomes discernible so that the overall quality of the video image is increased. The system improves color fidelity since maladjustment of the black level can manifest itself as a color shift because the transfer functions of the sensor 28 and the linear to log LUT 34 are mismatched. The system enables the black level required for good color fidelity in low light conditions to be determined and adjusted. U.S. patent application Ser. No. 267,867 filed by David R. Cok on Nov. 7, 1988 and entitled "Apparatus and Accompanying Methods for Achieving Automatic Color Balancing in a Film to Video Transfer System", as referred to above, is incorporated by reference herein.

From the foregoing description, it will be apparent that there has been provided an improved system for calibrating the photographic image (film or slide) to video transfer system. Variations and modifications in the herein described system will undoubtedly suggest themselves to those skilled in the art. Accordingly, the foregoing description should be taken as illustrative and not in a limiting sense.

We claim:

1. The method of adjusting the optical intensity to video signal transfer characteristic of a system which translates an optical image into video signals which vary between levels corresponding to black and white luminance of said image upon electronic display, said method comprising the steps of illuminating an image-to-video sensor which converts said image into video signals at a first level of light intensity which is sufficient to provide said video signals at maximum amplitude, first adjusting the amplitude of said video signals to provide video output signals of a first amplitude while said sensor is being illuminated at said first level of light intensity, reducing the level of intensity of illumination of said sensor to a second level, second adjusting the black level of said video output signals while said sensor is being illuminated at said second level of light intensity so that said black level of said video output signals is at least equal to the amplitude of the signals from said sensor in the absence of illumination.

2. The method according to claim 1 wherein said black level is adjusted to be about 10% of said maximum level.

3. The method according to claim 1 wherein said second level of light intensity is 10% of said first level of light intensity, said black level being 10% of said maximum amplitude.

4. The method according to claim 1 further comprising the step of digitizing said video output signals into digital signals which can have a maximum value, said maximum amplitude corresponding to 100% of said maximum value of said digital signals.

5. The method according to claim 1 wherein said illuminating step is carried out by varying the area of an aperture through which said sensor is illuminated.

6. The method according to claim 5 wherein said illumination reducing step is carried out by inserting a neutral density filter in the path of the light which passes through said aperture to said sensor.

7. The method according to claim 4 wherein said digitizing step is carried out by scanning with said sensor an area thereon which is adapted to be illuminated by the image which said sensor converts to provide, as said video output signals, a stream of pixel signals from a field consisting of successive lines which extend in the direction of one of two rectangular coordinates defining the length and width of said area, and digitizing said pixel signals to provide said digital signals as digital pixel signals which correspond to said pixels, and said illuminating step is carried out by calculating the average value of the digitized pixel signals in said field and varying said illumination until said average value is equal to the maximum value of said digital signals.

8. The method according to claim 7 wherein said first adjusting step is carried out by amplifying said pixel signals and controlling the gain in amplitude thereof until said average value is a first average value which corresponds to said first amplitude, and said second adjusting step is carried out until said average value is reduced to a second average value which is that percentage of said first average value which said second level is of said first level.

9. The method according to claim 8 wherein said average value calculating step is carried out by accumulating the value of the digital pixel signals in each line of each of the paxels of said field, which paxels consist of contiguous zones of said field each consisting of different segments of different groups of successive lines in said field, and averaging said accumulated values.

10. The method according to claim 8 wherein said first and second adjusting steps are carried out by processing said pixel signals while they are in analog form to calibrate the white level and the black level thereof respectively.

11. Apparatus for adjusting the optical intensity to video signal transfer characteristic of a system which translates an optical image into video signals which vary between levels corresponding to black and white luminance of said image upon electronic display, said apparatus comprising an image to video sensor which converts said image into video signals, means for illuminating said sensor at a first level of light intensity which is sufficient to provide said video signals at maximum amplitude, first means for adjusting the amplitude of said video signals to provide video output signals of a first amplitude while said sensor is being illuminated at said first level of light intensity, means for reducing the level of intensity of illumination of said sensor to a second level, second means for adjusting the black level of said video output signals while said sensor is being illuminated at said second level of light intensity so that said black level of said video output signals is at least equal to the amplitude of the signals from said sensor in the absence of illumination.

12. The apparatus according to claim 11 wherein said second means is operative to adjust said black level to be about 10% of said maximum level.

13. The apparatus according to claim 11 wherein said reducing means includes means for providing second level of light intensity at 10% of said first level of light intensity, said second means being operative to adjust said black level to 10% of said maximum amplitude.

14. The apparatus according to claim 11 further comprising means for digitizing said video output signals into digital signals which can have a maximum value, said maximum amplitude corresponding to 100% of said maximum value of said digital signals.

15. The apparatus according to claim 11 wherein said illuminating means comprises an aperture having a variable area and means for varying the area of said aperture through which said sensor is illuminated.

16. The apparatus according to claim 15 wherein said illumination reducing means comprises a neutral density filter in the path of the light which passes through said aperture to said sensor.

17. The apparatus according to claim 14 wherein said digitizing means comprises means for scanning, with said sensor, an area thereon which is adapted to be illuminated by the image which said sensor converts to provide, as said video output signals, a stream of pixel signals from a field consisting of successive lines which extend in the direction of one of two rectangular coordinates defining the length and width of said area, and means for digitizing said pixel signals to provide said digital signals as digital pixel signals which correspond to said pixels, and said illuminating means includes means for calculating the average value of the digitized pixel signals in said field, and means for varying said illumination until said average value is equal to the maximum value of said digital signals.

18. The apparatus according to claim 17 wherein said first adjusting means comprises means for amplifying said pixel signals and controlling the gain in amplitude thereof until said average value is a first average value which corresponds to said first amplitude, and said second adjusting means is operative to reduce average value to a second average value which is that percentage of said first average value which said second level is of said first level.

19. The apparatus according to claim 18 wherein said average value calculating means comprises means for accumulating the value of the digital pixel signals in each line of each of the paxels of said field, which paxels consist of contiguous zones of said field each consisting of different segments of different groups of successive lines in said field, and means for averaging said accumulated values.

20. The apparatus according to claim 18 wherein said first and second adjusting means comprise means for processing said pixel signals while they are in analog form to calibrate the white level and the black level thereof, respectively.

* * * * *

UNITED STATES PATENT AND TRADEMARK OFFICE
CERTIFICATE OF CORRECTION

PATENT NO. : 4,912,558　　　　　　　　　　　　　　　Page 1 of 4

DATED : March 27, 1990

INVENTOR(S) : Robert W. Easterly; John R. Fredlund; Anthony W. Schrock; Lawrence E. Walther It is certified that error appears in the above-identified patent and that said Letters Patent is hereby corrected as shown below:

The sheets of drawings consisting of figures 1-8 should be deleted to appear as per attached sheets.

On the title page, "20 Claims, 19 Drawing Sheets" should read --20 Claims, 3 Drawing Sheets--.

Signed and Sealed this

Sixteenth Day of April, 1991

Attest:

HARRY F. MANBECK, JR.

*Attesting Officer*　　　　　　　*Commissioner of Patents and Trademarks*